No. 638,903. Patented Dec. 12, 1899.
B. BONNIKSEN.
SPEED INDICATOR.
(Application filed June 18, 1898.)
(No Model.) 4 Sheets—Sheet 1.
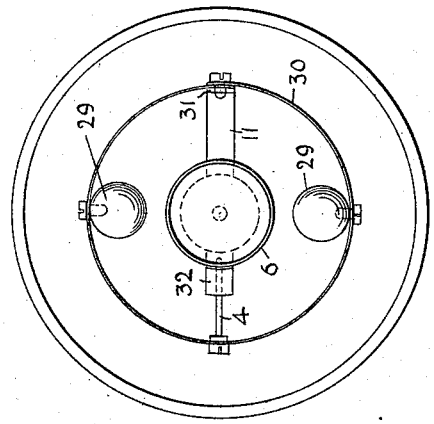
FIG. II.
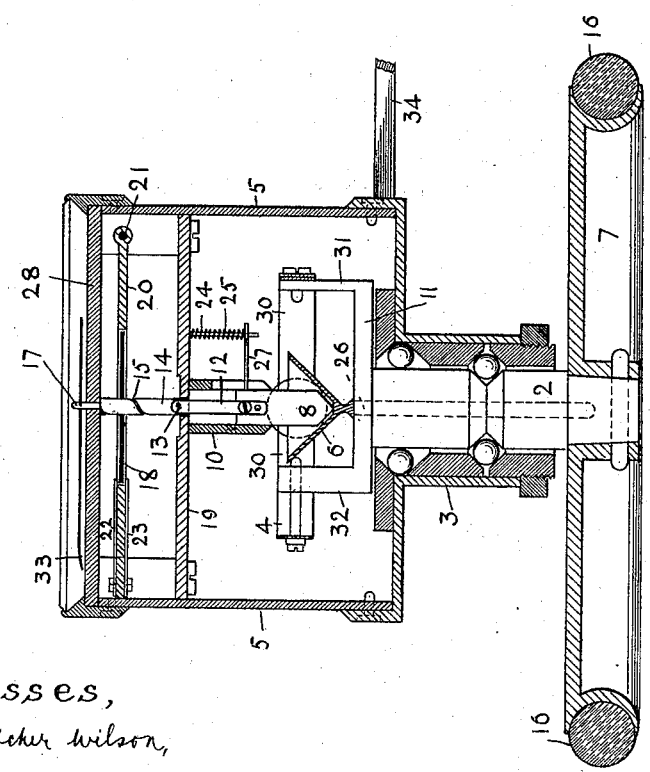
FIG. I.
Witnesses,
Thos. Fletcher Wilson,
John T. Fazakerley.
Inventor,
Bahne Bonniksen,
per
G. Douglas Leechman
Attorney.

No. 638,903. Patented Dec. 12, 1899.
B. BONNIKSEN.
SPEED INDICATOR.
(Application filed June 18, 1898.)
(No Model.) 4 Sheets—Sheet 2.
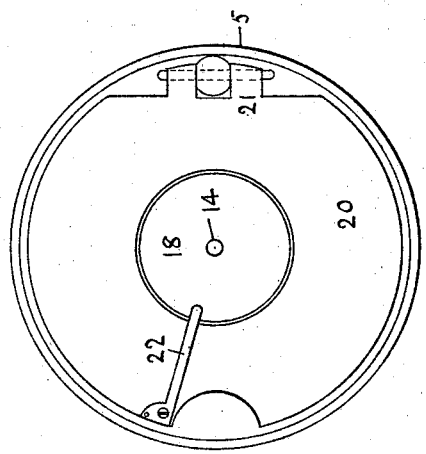
FIG. III.
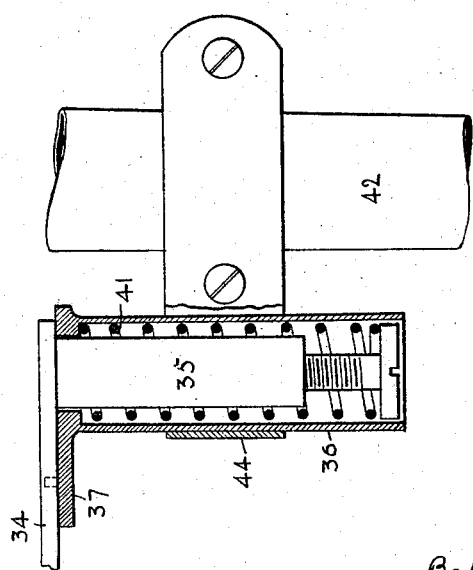
FIG. IV.
Witnesses,
Thos. Fletcher Wilson,
John J. Fazakerley.
Inventor,
Bahne Bonniksen
per.
G. Douglas Leechman.
Attorney.

No. 638,903. Patented Dec. 12, 1899.
B. BONNIKSEN.
SPEED INDICATOR.
(Application filed June 18, 1898.)
(No Model.) 4 Sheets—Sheet 3.
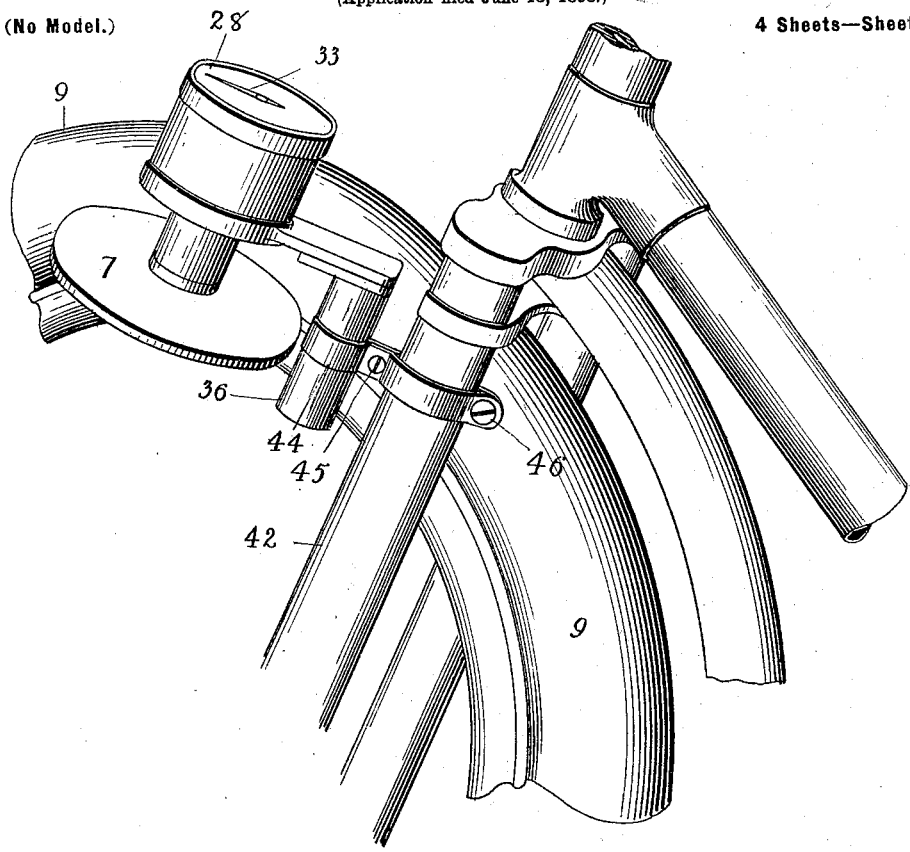
FIG. VII.
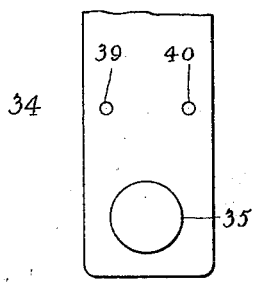
FIG. V.
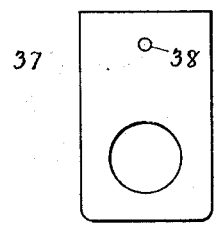
FIG. VI.
Witnesses.
Thomas Fletcher Wilson
John Thomas Fazakarley.
Inventor
Bahne Bonniksen
per
G. Douglas Leechman
attorney No. 638,903. Patented Dec. 12, 1899.
B. BONNIKSEN.
SPEED INDICATOR.
(Application filed June 18, 1898.)
(No Model.) 4 Sheets—Sheet 4.
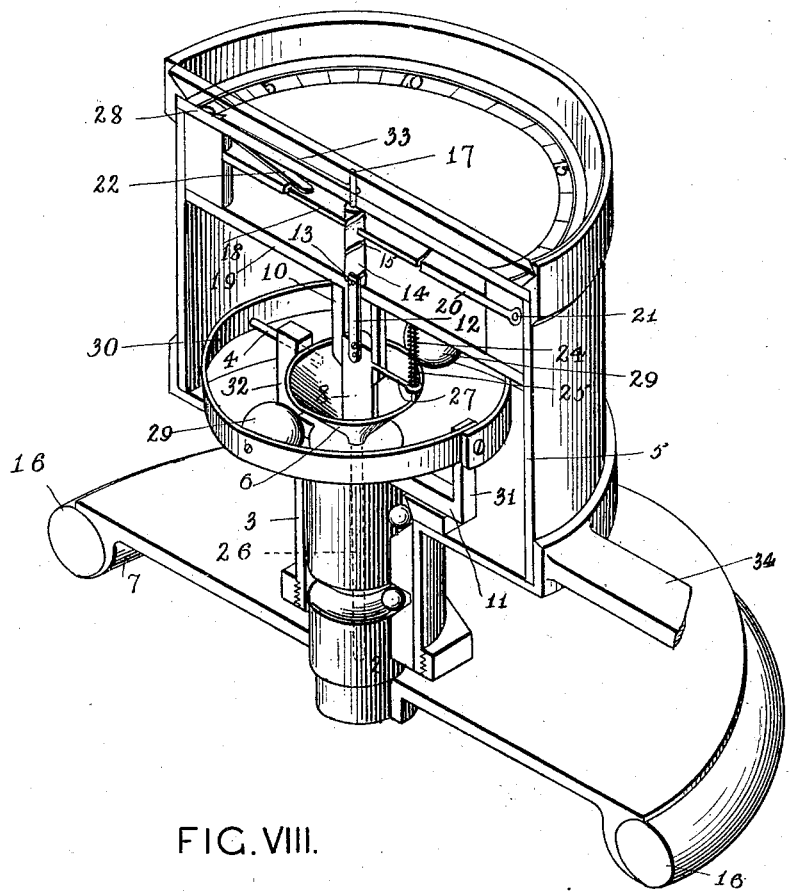
FIG. VIII.
Witnesses,
John T. Fagakarley.
John R. Anderson.
Inventor,
B. Bonniksen
per
G. Douglas Leechman.
Attorney.

UNITED STATES PATENT OFFICE.

BAHNE BONNIKSEN, OF COVENTRY, ENGLAND.

SPEED-INDICATOR.

SPECIFICATION forming part of Letters Patent No. 638,903, dated December 12, 1899.

Application filed June 18, 1898. Serial No. 683,815. (No model.)

*To all whom it may concern:*

Be it known that I, BAHNE BONNIKSEN, a citizen of Germany, residing at Coventry, in the county of Warwick, England, have invented certain new and useful Improvements in Speed-Indicators, of which the following is a specification.

My invention relates to speed-indicators, especially such as are intended to be used on velocipedes, though speed-indicators constructed according to my invention may be used in connection with other machinery; and my invention consists, essentially, in a hoop of spring-steel or the like adapted to revolve in its own plane, carrying weights at opposite points and so connected to a revoluble axle that as the speed of such axle varies so the diameter of the hoop between the weights varies directly and the diameter of the hoop transverse to the first diameter varies inversely. The variation in the transverse diameter of the hoop affects the mechanism which indicates the speed.

My invention also comprises means, mechanical or otherwise, for maintaining the steadiness of the indicating-hand when the instrument is subject to vibration set up by rough roads or in other ways, means for mounting the instrument on a velocipede in such a position that it may be readily read by the rider thereof without resorting to the use of cords and pulleys or the like, and means for setting and holding the instrument either in action or out of action, as required.

In the accompanying drawings, Figure I is a vertical section through the body of the instrument. Fig. II is a plan of the spring-hoop. Fig. III is a plan of the steadying device. Fig. IV is an elevation, partly in section, showing the means for mounting the instrument on the velocipede. Fig. V is an under side view of the part 34 in Fig. IV. Fig. VI is a top side plan of the part 37 in Fig. IV. Fig. VII shows the instrument in position on the velocipede. Fig. VIII is a perspective view of the parts shown in Fig. I.

Like numerals refer to like parts throughout the drawings.

In constructing a speed-indicator suitable for a velocipede according to my invention I mount a main vertical axle 2 preferably in adjustable ball-bearings in the lower part of or in an extension 3 of a cylindrical case 5. The lower end of the axle 2 projects through the bottom of the case and carries a wheel 7, the periphery of which is adapted to bear against the side of the tire 9 of the steering-wheel of the velocipede. To the top of the axle 2 is secured a transverse bar 11, one arm of which is longer than the other, and from each end of the bar rises a standard 31 32. A band 30 of spring-steel or the like is secured by its overlapping ends to the standard 31 on the longer arm and is maintained in a horizontal position by a long stud 4, secured to the diametrically opposite point on the band. The stud 4 is passed into a horizontal hole in the other standard 32 and is free to slide therein. To this hoop-like band 30, at each of the two points situated equidistantly between the standards 31 32, is attached a suitable weight 29 29. As the axle 2 and hoop 30 are rotated by contact of the wheel 7 against the revolving tire 9 the weights 29 29 are caused to fly farther and farther apart by the centrifugal force. This causes the inner end of the stud 4 to press inward against the exterior of a hollow inverted cone or funnel 6, the apex of which is secured to a vertical stem 26, sliding freely in an axial hole bored down through the vertical axle 2 and the transverse arm 11 on the top thereof. A vertical plunger 8, which may have a jeweled bearing, rests in the angle of the funnel 6 and is guided by its upper part sliding in a vertical tube 10, supported by a plate 19 in the case of the instrument. To one side of the plunger 8 is secured the lower end of a light vertical inwardly-bearing blade-spring 12, the upper end of which passes up through a suitable aperture in the said plate 19 and carries an inwardly-directed horizontal conical peg 13. The plunger is pressed downward by a suitable spring. For example, an expansion spiral spring 24 may be threaded onto a rod 25, depending from the above-mentioned plate 19, and pass through a hole in another rod 27, projecting horizontally from the plunger. The plunger 8, though capable of vertical movement, is prevented from rotating by any suitable means, such as by the said horizontal rod 27 engaging in a longitudinal slot in the vertical tube 10. The conical peg 13 on the blade-spring 12 engages firmly in a slow spiral groove 15, cut in a vertical spindle 14, mounted coaxially with the vertical axle 2 and the plunger 8 in the upper part of the case 3. The grooved spindle 14 is capable of rotation, and the reduced upper end 17 thereof projects through the dial 28 and carries the indicating-hand 33. As the speed increases the pressure of the stud 4 against the funnel 6 causes the said funnel to rise, and the plunger 8 and blade-spring 12 rise with it. This causes the peg 13 to travel in the spiral groove 15 and so rotates the spindle 14 and moves the hand 33 forward over the dial 28, which is suitably graduated. As the speed decreases the plunger 8 falls by gravitation, assisted by the expansion-spring 24, and the indication-hand travels backward. In short, according as the hoop 30 is more or less distorted by the higher or lower speed of the road wheel and tire 9 so the grooved spindle 14 is caused to rotate forward or backward and the indicating-hand to travel over the dial accordingly.

Although I prefer to arrange the hoop horizontally and adapt it to rotate in its own plane, as above described, it may be arranged vertically and be adapted to rotate around its vertical diametrical axis. In this case I form two slots transversely through the main vertical axle. The ends of the hoop are secured in one slot, while the diametrically opposite part of the hoop passes freely through the other slot and is free to rise and fall therein, according as the centrifugal force tends to distort the hoop more or less as the speed rises and falls. The weights are attached to the intermediate parts of the hoop, as before described, and the motion of the rising-and-falling part of the hoop actuates the indicating-hand by a modification of the mechanism hereinbefore described or by other suitable means.

In order to maintain the steadiness of the indicating-hand 33 when the instrument is subjected to vibration, I mount on the spindle 14 a flat disk 18 or the like. Around this disk I place a large flat ring 20, the internal diameter and the thickness of which are respectively somewhat greater than the external diameter and the thickness of the said disk 18. The ring 20 is hinged at 21 at one side to the case 3, and to the opposite side thereof are attached two blade-springs 22 23. These springs are secured one, 22, on the upper surface and the other, 23, on the lower surface of the ring 20 by their outer ends, while their inner ends overlap the edge of the disk 18 to a suitable extent. Normally the ring 20 is supported by the upper spring 22, resting on the disk 18; but when the instrument is subjected to shocks the ring 20 vibrates on its hinge 21, and the springs 22 23 bear alternately on the upper and lower surfaces of the disk 18. The springs press sufficiently hard on the disk to act as a brake, and the indicating-hand (which is mounted on the spindle carrying the disk) is only free to travel during the momentary intervals when both springs 22 23 are clear of the disk. Hence the hand 33 is unable to make the excessive movements which jolts would otherwise be liable to cause it to make, or the steadiness of the hand might be maintained by attaching a fly to the spindle which carries the hand and inclosing the said fly in a box containing a semiviscous fluid, such as glycerin; or a repeater-train such as employed in some repeating-watches or a ratchet-wheel gearing with pallets, as employed in some alarm-clocks, or any other device having the same steadying effect may be employed.

I prefer to construct the wheel 7 with a grooved ring adapted to receive a rubber tire 16, which may be replaced when worn, so that the size of the wheel 7 may be maintained approximately constant in spite of wear.

The case of the instrument may be provided with a projecting arm 34, carrying a depending leg 35. This leg slides into a tube 36, having a projecting bracket 37 at the top. The arm 34 and bracket 37 are adapted to engage with each other in either of two positions by the peg 38 and holes 39 40, device shown by Figs. IV, V, and VI, or by some equivalent device, and a spring 41 tends to hold the leg 35 down in the tube 36, so that by raising the case against the action of the spring the peg 38 is disengaged from the holes 39 40, and the instrument may be either turned toward the road-wheel, so as to engage with the tire 9, or be turned away therefrom when not required for use. On releasing the case the spring 41 reëngages the peg 38 in either of the holes 39 40, as desired, and secures the instrument in either its operative (39) or inoperative (40) position, as the case may be.

The instrument may be adjustably attached to one of the members of the steering-fork 42, where it is readily seen by the rider, by a suitable clip, preferably constructed of a strip of flexible sheet metal or other suitable material. The strip is doubled, the bent part 44 being formed into a split cylindrical grip adapted to hold the tube 36. This grip is contracted by a suitable bolt and nut 45, and a similar bolt and nut 46 are employed at the ends of the strip to contract the clip on the fork side 42, which is adapted to pass between the two parts of the clip intermediate of the bolts, as shown.

In constructing speed-indicators for other machinery I proceed substantially as herein described; but in any case modifications may be made without exceeding the limits of my invention. The spring-hoop is particularly suitable for my purpose, as it will continue to distort and resume its shape indefinitely, and, being without joints, is not liable to become inaccurate or get out of order. Further, as its resistance to distortion increases much more rapidly than the degree of displacement it is specially suitable for use in conjunction with centrifugal force, which increases as the square of the speed.

What I claim as my invention, and desire to secure by Letters Patent, is—

1. In a speed-indicator, the combination of a case, a vertical revoluble axle mounted in such case, a wheel attached to such axle and adapted to bear against a revolving part of the machine, a transverse bar secured to the top of the said axle, an elastic hoop secured at one point to a standard on the said bar, a stud secured to the diametrically opposite point of the hoop and passing through a horizontal hole in another standard on the said bar, two weights attached respectively to diametrically opposite points on the said hoop equidistant between the two said standards, a hollow inverted cone adapted to be pressed against by the said stud, a vertical stem secured to the apex of the said cone and adapted to slide in an axial hole in the vertical axle, a vertical plunger resting in the angle of the cone and sliding in a vertical tube, a plate fitted in the case and supporting the said vertical tube and means for indicating the movements of the hoop, stud, cone and plunger on a suitable dial, substantially as set forth.

2. In means for indicating the movement of a vertical plunger in a speed-indicator, the combination with such plunger of a vertical, inwardly-bearing blade-spring, an inwardly-directed horizontal conical peg attached to the upper end of the said spring, means for pressing down the said plunger, a fixed vertical tube, a vertical slot in the said tube, a horizontal rod projecting from the said plunger through the slot, a revoluble vertical spindle having a slow spiral groove adapted to receive said peg, an indicating-hand secured to the upper end of the said vertical spindle and a graduated dial, substantially as set forth.

3. In means for maintaining the steadiness of the indicating-hand in a speed-indicator, the combination of a revoluble spindle, a disk mounted on such spindle, a flat ring loosely surrounding the disk and of greater thickness than said disk hinged at one side to the case of the instrument, a blade-spring mounted on the upper surface of the ring and overlapping the disk, and a blade-spring mounted on the under surface of the ring and overlapping the disk, substantially as set forth.

4. In a speed-indicator the combination with the case thereof of a projecting arm carrying a depending leg, a tube adapted to receive said leg and having a projecting bracket at the top, a peg on the bracket and two holes in the arm adapted to receive the said peg, a spring tending to hold the leg down in the tube and means for holding the spring in place, substantially as set forth.

BAHNE BONNIKSEN.

Witnesses:
JOHN THOMAS FAZAKARLEY,
THOMAS FLETCHER WILSON.